(12) United States Patent
Turner et al.

(10) Patent No.: US 8,448,654 B2
(45) Date of Patent: May 28, 2013

(54) ROTARY SPRAY WASHER

(75) Inventors: Barry S. Turner, Novi, MI (US); David L. Tognetti, Howell, MI (US); Michael S. Sayyae, Westland, MI (US)

(73) Assignee: Belanger, Inc., Northville, MI (US)

( * ) Notice: Subject to any disclaimer, the term of this patent is extended or adjusted under 35 U.S.C. 154(b) by 225 days.

(21) Appl. No.: 12/871,225

(22) Filed: Aug. 30, 2010

(65) Prior Publication Data

US 2012/0048311 A1 Mar. 1, 2012

(51) Int. Cl.
*B08B 9/08* (2006.01)

(52) U.S. Cl.
USPC .......................................................... 134/179

(58) Field of Classification Search
USPC .......................................................... 134/179
See application file for complete search history.

(56) References Cited

U.S. PATENT DOCUMENTS

| 3,979,066 A | 9/1976 | Fortner |
| 4,175,575 A | 11/1979 | Cushing |
| 6,193,169 B1 | 2/2001 | Steinhilber et al. |
| 6,209,802 B1 | 4/2001 | Koivunen |
| 7,243,665 B1 | 7/2007 | Turner et al. |

FOREIGN PATENT DOCUMENTS

RU 2021042 C1 * 10/1994

* cited by examiner

*Primary Examiner* — Michael Barr
*Assistant Examiner* — Jason Riggleman
(74) *Attorney, Agent, or Firm* — Young Basile Hanlon & MacFarlane PC

(57) ABSTRACT

A rotary spray washer for heavy duty applications. Each spray device in the system comprises a rotary coupling and two sets of radially extending spray arms. Each set of arms has nozzles at the distal ends to direct water generally toward a target area but angled enough to produce a rotation-producing reaction torque. One set of arms is longer than the other whereby the shorter arms produce a reaction torque which limits the overall speed of rotation without the need for a friction brake or fluid pump brake.

6 Claims, 5 Drawing Sheets

ROTARY SPRAY WASHER

FIELD OF THE INVENTION

This invention relates to high pressure washing systems for vehicles and other articles and particularly to a rotary spray device for use in such a system.

BACKGROUND OF THE INVENTION

Rotary spray devices are often used in washing systems for heavy duty use; i.e., for use in removing dirt and other surface contaminants from truck bodies and the like. Such spray devices use rotor assemblies with angled nozzles on the ends of radial arms to produce reaction force tending to spin the rotor assembly while at the same time directing high pressure jets of water toward the surface to be cleaned.

It is generally recognized that it is desirable to limit the speed at which such rotary spray devices operate in order to preserve or extend the life of the bearings used in the rotary coupling to which the nozzle arms are mounted. U.S. Pat. No. 6,193,169 describes a device using a friction brake to achieve this purpose. U.S. Pat. No. 6,209,802 describes another rotary spray using a fluid brake which is built into the spinner housing and includes a pressure regulator comprising a valve and a bias spring.

SUMMARY OF THE INVENTION

The present invention, according to a first aspect thereof, provides an improved rotary spray device which eliminates the need for either friction brakes or fluid pump brakes of the type found in the prior art devices described above. As a result, the rotary spray device of the present invention extends useful bearing life while at the same time substantially reducing cost to manufacture.

In general, the objectives of the present invention are achieved through the use of a rotary assembly having at least one spray arm which extends radially therefrom and has a nozzle outlet at the distal end thereof to emit water generally toward a target. The outlet is angled enough to provide a first reaction force which tends to rotate the assembly about an axis in a first angular direction. The assembly further comprises a second radially extending spray arm with a nozzle outlet at the distal end thereof which emits water generally toward the target but is angled sufficiently with respect thereto to tend to rotate the assembly in a direction opposite to the first direction. In accordance with the invention, the first reaction force is greater than the second reaction force whereby the rotary assembly rotates at a controlled speed with the first reaction force acting as a drive and the second reaction force acting as a speed-retarding brake.

In the embodiments illustrated herein, the spray arms are arranged in pairs for balance and the arms which produce the first reaction force; i.e., the driving force, are longer than the arms providing the braking force such that equal amounts of water may be directed to all of the arms but the difference in length is such as to cause the driving torque to be greater than the braking torque. This allows for the use of conduit or pipe components of the same diameter for all arms as well as nozzles of identical specification on the ends of all of the arms.

In accordance with the second aspect of the invention, a spray washer system is provided using multiples of the rotary spray devices defined above. In a preferred embodiment illustrated herein, multiple spray arms are arranged on each of two opposing vertical supports which are far enough apart to accommodate a vehicle therebetween. All of the spray devices are connected to a high pressure source comprising a variable pressure pump and suitable water supply conduits. In addition, a collector system is provided whereby the sprayed water, together with at least some of the contaminants removed from the article being washed, is collected, treated such as by filtering to the extent deemed necessary and returned to the spray devices by way of the high pressure pump along with as much makeup water as is required.

It will be understood that the term "water" is used herein to refer to the cleaning medium and that while the medium will typically be constituted primarily of water, it may also contain suitable chemicals such as detergents, rinsing chemicals and other compounds typically found in vehicle washing applications. While not intended in a limiting sense, it is to be understood that the pressures typically used in systems of this type vary from 0 to 300 psi, pipe diameters are on the order of ¾" and rotation rates are on the order of 0-1500 rpm. These figures are given by way of example and are not to be construed as limiting the invention to any specification or embodiment type.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
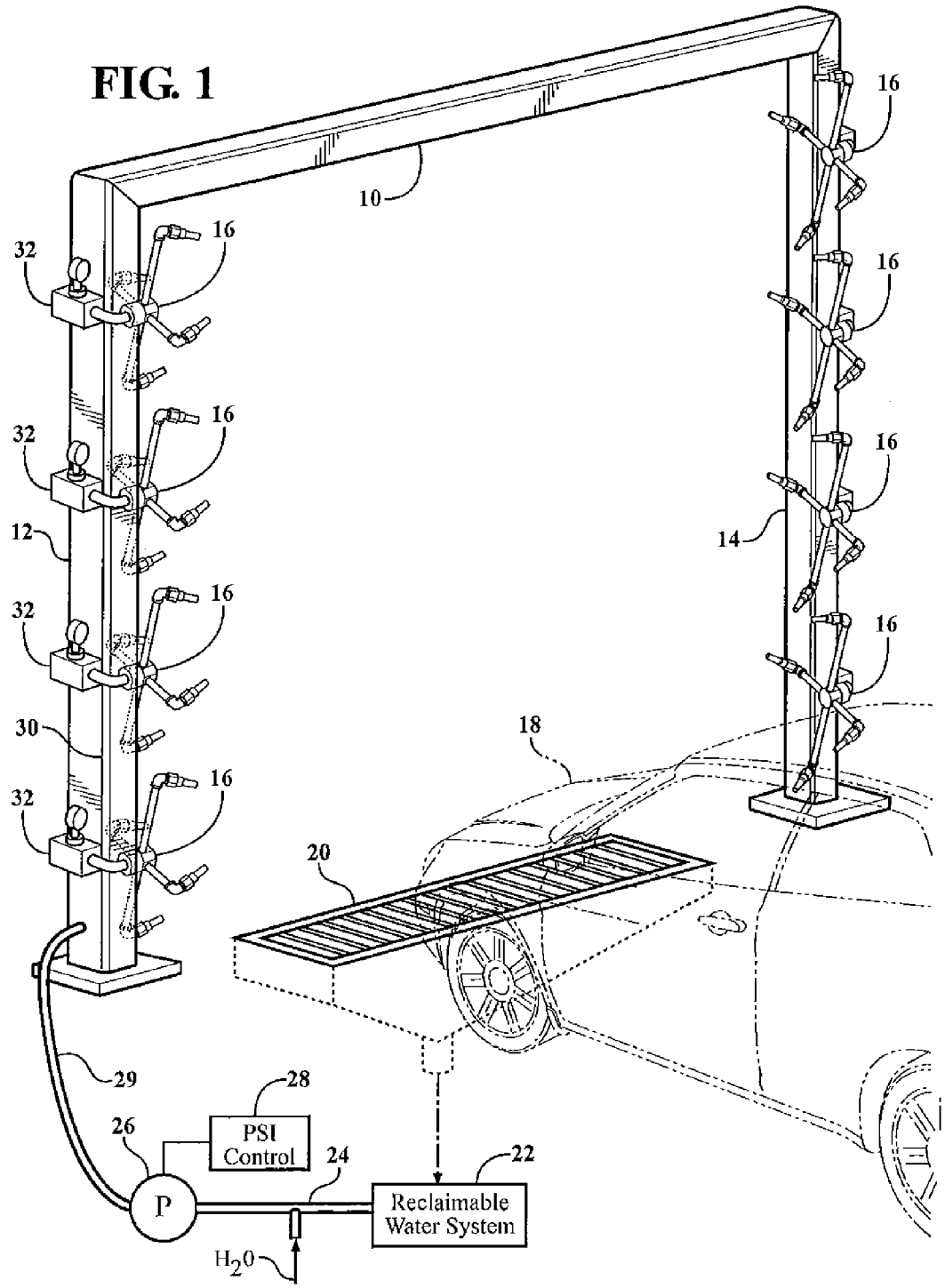
FIG. 1 is a perspective view of a system incorporating the invention.
Figure 2:
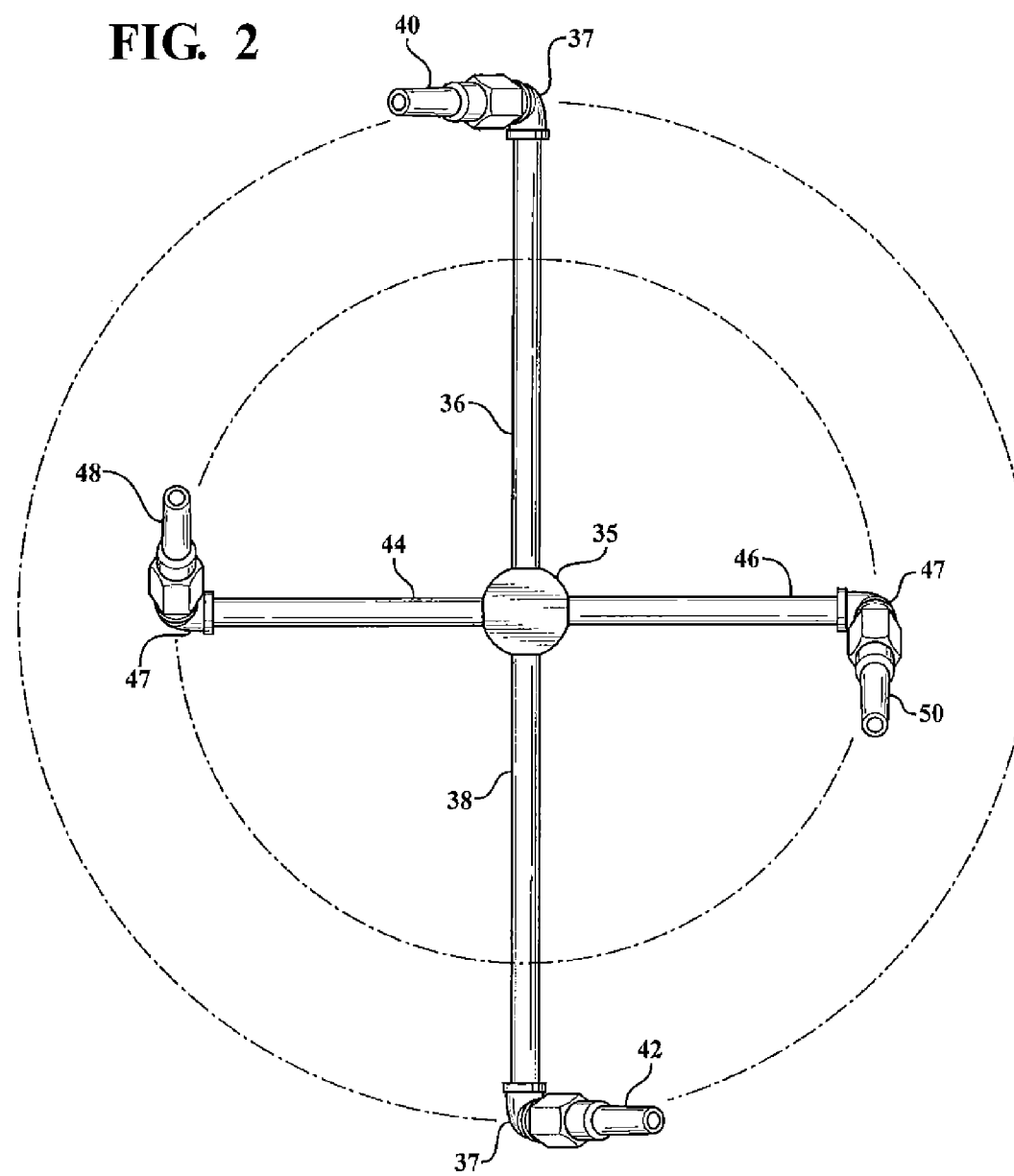
FIG. 2 is a front view of a spray device incorporating the invention.

Referring to FIG. 1, a spray washer system for vehicles is shown to comprise an inverted U-shaped arch 10 having vertical side portions 12, 14 of such size as to readily accommodate a vehicle 18 therethrough. While the drawings show a passenger car as vehicle 18, it is to be understood that the system shown in FIG. 1 is typically used for heavy duty applications involving washing of trucks which are subject to heavy soiling.

Each of the vertical portions 12, 14 of arch 10 is equipped with four rotary spray devices 16 which are aimed inwardly toward one another toward and opposite sides of the vehicle 18 as it passes through and between the elements of the arch 10. Because the system of FIG. 1 consumes large amounts of water and/or other spray fluids, a collection system including a grate 20 is located in the floor over which the vehicle passes to collect water after it has contacted and drained from the vehicle 18. The collected water is treated by treatment device 22, typically a filter but it may be a more complex water treatment device, and returned by conduit 24 to the supply system pump 26 along with any makeup water which may be necessary. A pressure control 28 is provided for the pump 26. The pump 26 is connected through a supply line 29 to a conduit 30 which runs around the arch 10 to supply water to all of the spray devices 16. It will be appreciated by persons skilled in the fluid supply arts that more complex supply systems including parallel supply conduits may be desired to ensure a uniform supply of water to each of the spray devices 16.

Figure 3:
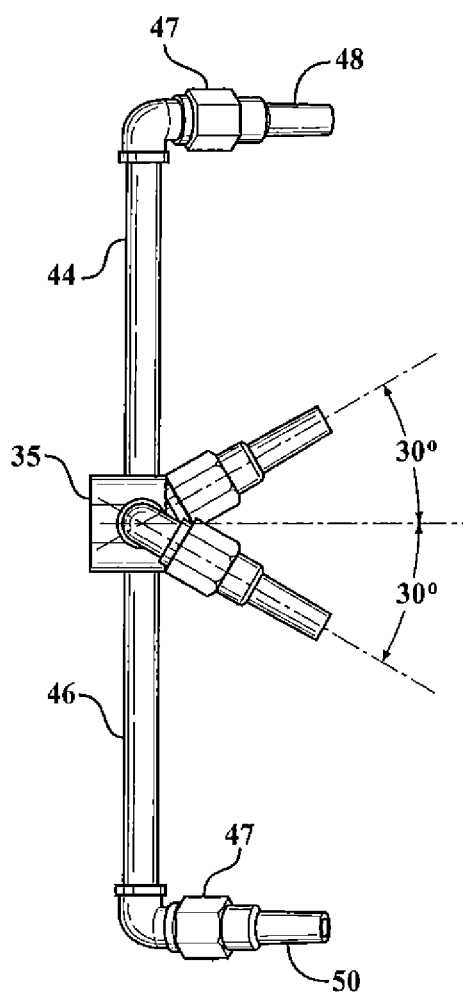
FIG. 3 is a side view of the FIG. 2 Spray device.
Figure 4:
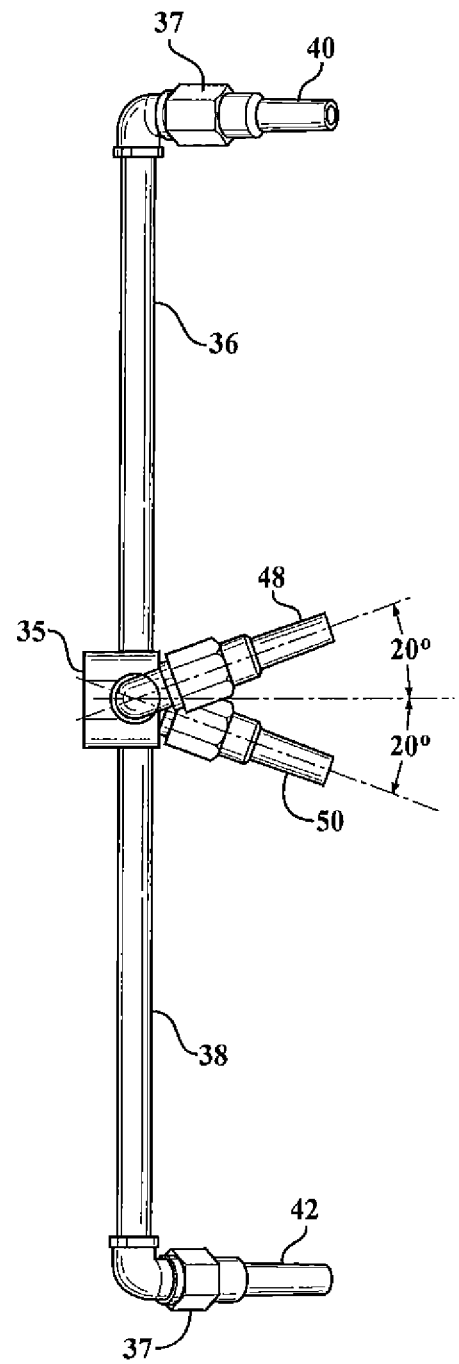
FIG. 4 is another side view of the FIG. 2 spray device.
Figure 5:
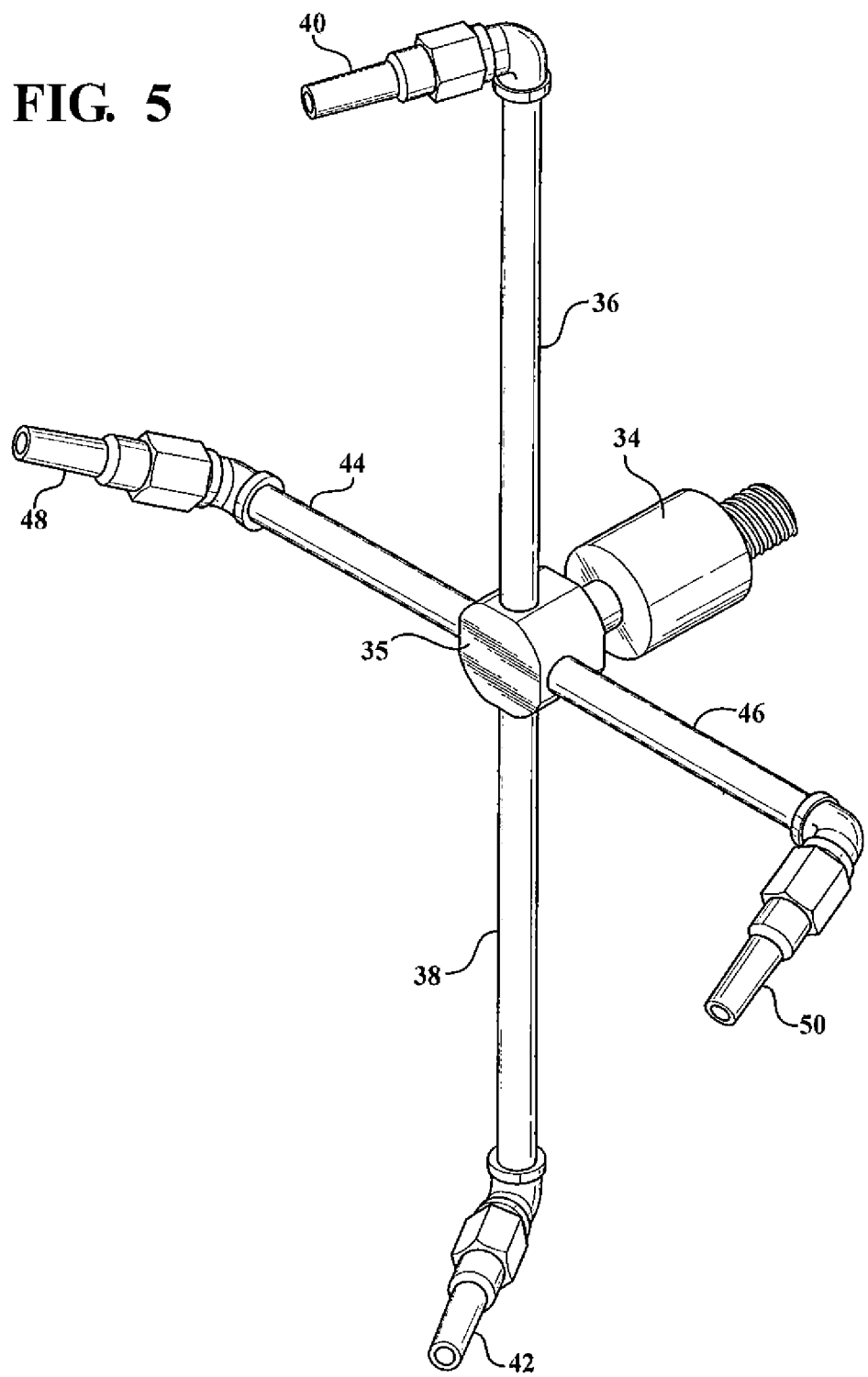
FIG. 5 is a perspective view of the FIG. 2 spray device.

Referring to FIGS. 2 through 5, each spray device is shown to comprise a coupling 34 which is adapted to receive water from the conduit 30 in substantial quantity and at substantial pressures determined by the setting of the device 28. Coupling 34 is a commercially available device containing a bearing. Coupling 34 is connected to a manifold 35 which in turn is connected to arms 36, 38 made up of ¾" pipe. The arms 36, 38 terminate in couplings 37 which are in turn threadedly connected to high pressure nozzles 40, 42 respectively which are aimed generally along the axis of rotation of the coupling; i.e., toward the center of the arch 10 but are angled as shown in FIG. 4 so as to impart a rotational torque or thrust to the coupling 34 tending to rotate it in a first direction.

Also connected in fluid coupling relation to manifold 35 are diametrically opposed shorter arms 44, 46 which are connected by couplings 47 to nozzles 48, 50, respectively. As shown in FIG. 3, these nozzles are also aimed generally along the axis of rotation so as to direct water toward the vehicle 18 when between the uprights 12, 14 of the arch 10 but are angled at approximately 30° to produce a reaction torque which opposes the reaction torque of the nozzles 40, 42 thus to act as a braking action to control the speed of rotation of the coupling 34 and preserve and elongate the life of the bearing within the coupling as described above. It is to be understood that the angles shown in FIGS. 3 and 4 are illustrative along with the lengths of the arms and that the design and the entire system may call for variations in parameters including arm length, nozzle angle, pressure and rotational speed.

Figure 6:
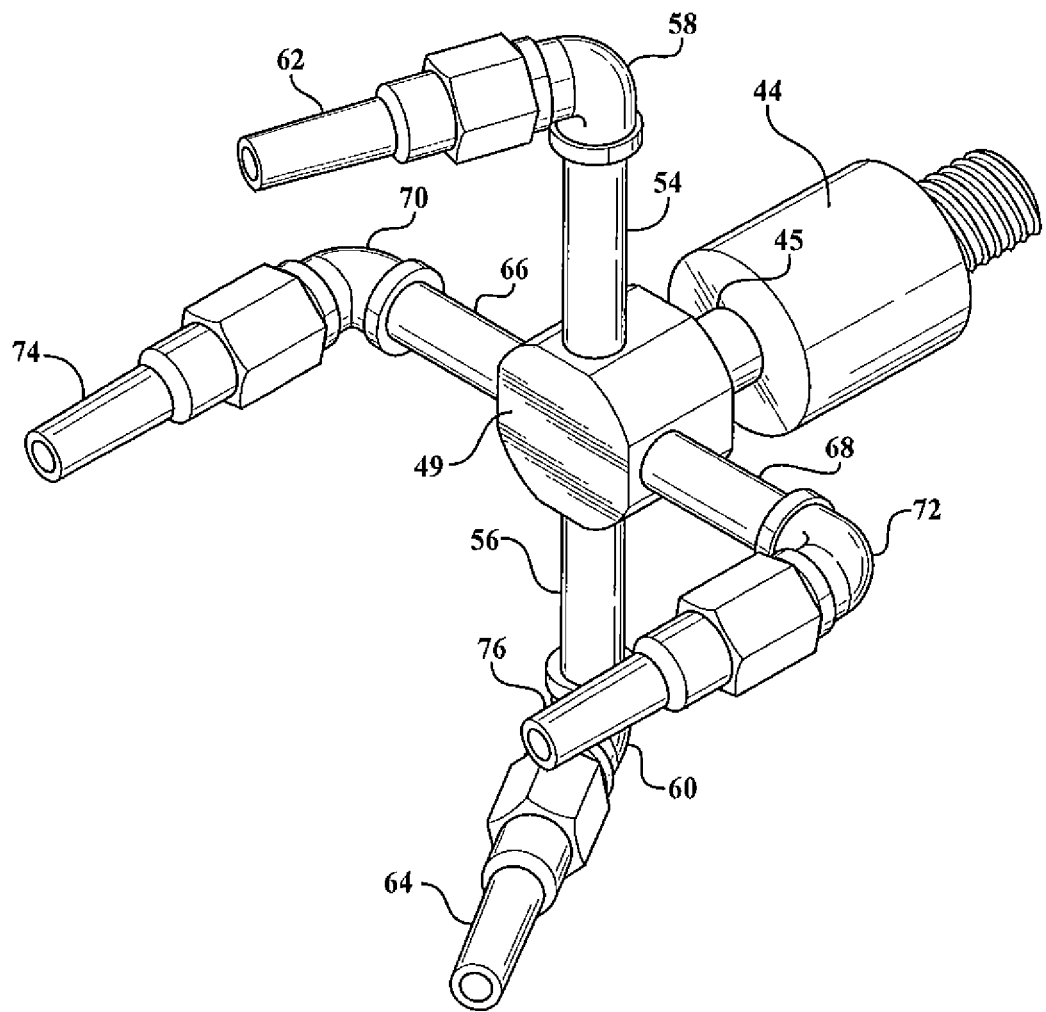
FIG. 6 is a perspective view of another embodiment.

FIG. 6 shows an alternative embodiment of the invention generally following the design concept of the device of FIGS. 2 through 5 but using shorter arms. In the device of FIG. 6, a fluid coupling 34 is connected by pipe 45 to a four-outlet manifold 49. Extending from manifold 49 are two sets of pipes or arms 54, 56 and 66, 68 of which arms 54 and 56 are longer than arms 66 and 68. Arms 54 and 56 terminate in couplings 58, 60 which couplings are connected to high pressure spray nozzles 62, 64 respectively. These nozzles are aimed along the axis of rotation of the coupling but are angled to produce a reaction torque in one direction as described above.

Shorter fluid supply arms in the form of ¾" pipe 66, 68 are provided with angled couplings 70, 72 respectively which in turn are connected by threaded connections to high pressure nozzles 74, 76 respectively. The reaction torque produced by water emitted by nozzles 74, 76 opposes the reaction torque produced by water emitted by nozzles 62, 64. The net reaction torque rotates the arms 54, 56, 66 and 68 in one direction and at a controlled speed. The device of FIG. 6 operates in a manner similar to the device in FIG. 2 but because of the shorter arm lengths, produces a less reaction torque and a lower speed of rotation assuming all other parameters are equal. In a commercial embodiment, the arch 10 provides a wash height of 12' 6" and uses brass fluid couplings. The length of arms 36, 38 can be on the order of 10" and the length of arms 44, 46 can be on the order of 6½". These figures are illustrative and are not to be construed in a limiting sense. The illustrated embodiments are also illustrative and can be variously reconfigured; e.g., the manifolds 35 and 49 can be smaller or replaced by a simple four-way coupling.

What is claimed is:

1. A rotary spray device comprising:
   a base;
   a water inlet;
   a rotary assembly connected to the base for rotation about an axis;
   said assembly further including a first pair of diametrically opposite spray arms extending radially from the assembly and connected to said inlet, each arm having a nozzle outlet at the distal end thereof to emit water generally toward a target but angled enough to provide a first reaction force tending to rotate the assembly in a first direction; and
   at least a second set of diametrically opposite spray arms extending from the assembly and connected to said water inlet, each arm a having nozzle outlet at the distal end thereof to emit water generally toward said target but angled enough to provide a second reaction force tending to rotate the assembly in a second direction which is opposite to the first direction, the arms in the first set being longer than the arms in the second set whereby the first reaction force is greater than the second reaction force.

2. A spray type washer system comprising a support and a plurality of rotary spray devices mounted to the support in spaced relationship to one another, each rotary spray device being constructed as defined in claim 1.

3. A spray washing system as defined in claim 2 further comprising means for collecting water emitted from the rotary spray devices and recycling the water so collected to said inlet.

4. A system as defined in claim 3 further comprising means for treating the collected water.

5. Apparatus as defined in claim 4 further comprising a pump connected to said inlet and means for varying the pressure of water supplied to inlet by said pump.

6. A pressure washing system comprising first and second spaced-apart supports, each of said supports having multiple spray devices connected thereto in spaced-apart relationship and aimed toward one another to provide a washing area therebetween which is large enough to accommodate a motor vehicle, each of the rotary spray devices being constructed as set forth in claim 1.

* * * * *